United States Patent

[11] 3,605,025

[72] Inventors Andrew James Lincoln
Concord;
Shimon Even, Cambridge, both of Mass.

[21] Appl. No. 837,666
[22] Filed June 30, 1969
[45] Patented Sept. 14, 1971
[73] Assignee Sperry Rand Corporation
New York, N.Y.

[54] FRACTIONAL OUTPUT FREQUENCY-DIVIDING APPARATUS
3 Claims, 3 Drawing Figs.

[52] U.S. Cl. .......... 328/48, 235/92 TE, 235/92 PE, 328/42, 328/51
[51] Int. Cl. .......... H03k 21/36
[50] Field of Search .......... 328/46, 48, 51, 42; 235/92 PE, 92 TE

[56] References Cited

UNITED STATES PATENTS

| | | | |
|---|---|---|---|
| 3,064,890 | 11/1962 | Butler | 328/46 X |
| 3,239,765 | 3/1966 | Carbrey | 328/46 X |
| 3,517,318 | 6/1970 | McDermond | 328/48 X |

*Primary Examiner*—John S. Heyman
*Attorney*—S. C. Yeaton

ABSTRACT: Apparatus for dividing the pulse repetition frequency of a pulse sequence by multiplying the frequency thereof by a rational fraction having a value less than unity. The apparatus comprises a plurality of pulse repetition frequency dividers, one of which is directly responsive to the pulse sequence and the others of which are responsive thereto via a plurality of respectively associated inhibiting gates. The dividers and the gates are alternately concatenated such that the pulse signal provided by each divider inhibits conduction of one input pulse to the next following divider.

INVENTORS
SHIMON EVEN
ANDREW J. LINCOLN
BY
H P Terry
ATTORNEY

INVENTORS
SHIMON EVEN
ANDREW J. LINCOLN
BY
HP Terry
ATTORNEY

FRACTIONAL OUTPUT FREQUENCY-DIVIDING APPARATUS

BACKGROUND OF THE INVENTION

1. Field of the Invention

The present invention pertains to pulse repetition frequency dividers.

2. Description of the Prior Art

Pulse repetition frequency dividers are known which divide the frequency of a pulse sequence by multiplying the frequency thereof by a rational fraction less than unity, the frequency thereof by a rational fraction less than unity, the value of whose denominator is limited to integral powers of two Such a device, for example, is the well-known binary rate multiplier.

Pulse repetition frequency dividers are furthermore known that multiply the frequency of a pulse sequence by a rational fraction, the value numerator whose numerator is limited to unity. Such a divider is commonly embodied utilizing a binary pulse counter.

A pulse repetition frequency divider whose multiplication factor is any rational fraction less than unity would provide a useful and desirable addition to the art. For example, in computation and control systems having a fixed-frequency clock pulse source, it is often desirable to provide a pulse sequence whose pulses occur synchronously with those of the clock source but whose repetition frequency is some rational fractional multiple of that of the clock pulse sequence.

SUMMARY OF THE INVENTION

The present invention provides apparatus for dividing the pulse repetition frequency of a pulse sequence by multiplying the frequency thereof by a rational fraction, which fraction may be expressed as A/B where A and B are positive integers such that A is less than B.

The apparatus of the present invention comprises a plurality of pulse repetition frequency dividers, each of which may comprise, for example, a binary pulse counter. One of the counters is directly responsive to the pulse sequence and the remaining counters are responsive thereto via a plurality of respectively associated inhibiting gates. The counters and the gates are alternately concatenated such that the overflow pulse signal provided by each counter inhibits conduction of one input pulse to the next following counter. An output pulse sequence is thereby provided whose repetition frequency is a rational fractional multiple of the frequency of the input pulse sequence.

The pulses of the output sequence occur synchronously with those of the input sequence and are spaced as uniformly as possible within the constraint of synchronism with respect to the input pulses.

DESCRIPTION OF THE PREFERRED EMBODIMENT

Figure 1:
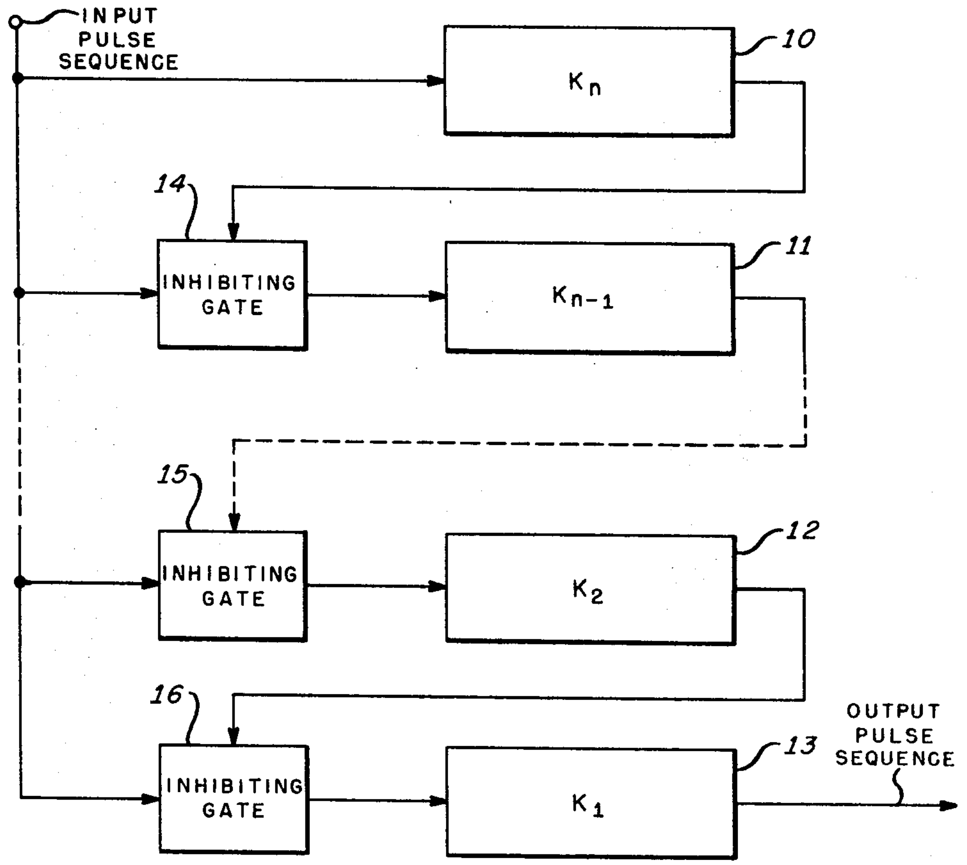
FIG. 1 is a schematic diagram in block form illustrating the general principle underlying the invention.

Referring to FIG. 1, a schematic block diagram is shown illustrating the general principle underlying the invention. Pulse repetition frequency dividers 10, 11, 12 and 13 are included, each of which comprises, for example, a binary pulse counter. An input pulse sequence, as indicated by the legend, is applied as an input to the counter 10 as well as to inhibiting gates 14, 15 and 16. The counter 10 provides an overflow pulse in response to receiving a number $K_n$ input pulses. The output of the counter 10 is applied as an inhibiting input to the inhibiting gate 14. When an overflow pulse is provided by the counter 10, the inhibiting gate 14 prevents conduction of the next-occurring input pulse to the counter 11. When, however, the counter 10 is not providing an overflow signal, the input pulses are conducted through the gate 14 to the counter 11.

The counter 11 is adapted to provide an overflow signal in response to receiving a number $k_{n11}$ input pulses through the gate 14. The overflow signal provided by the counter 11 is applied as an input to the next-following inhibiting gate. Following the counter 11 in concatenated fashion are a number of inhibiting gates and counters, as indicated by the dashed lines, the number dependent upon the rational fractional multiple implemented by the apparatus, in a manner to be explained.

The inhibiting gate 15 receives the overflow pulse from the preceding counter in the concatenated configuration. The inhibiting gates 15 and 16 and the counters 12 and 13 are connected in a manner similar to that described with respect to the preceding gates and counters in the circuit. The counters 12 and 13 provide overflow pulses in response to receiving respectively the numbers $K_2$ and $K_1$ input pulses through the respectively associated gates 15 and 16. The counter 13 provides an output pulse sequence, as indicated by the legend, whose repetition frequency is a rational fractional multiple of the frequency of the input pulse sequence, which multiple is obtained, in a manner to be explained.

The pulses of the output sequence occur synchronously with those of the input sequence and are spaced as uniformly as possible within the constraint of synchronism with the input pulses.

The number of counters and gates as well as the division constants $K_1$ through $K_n$ are determined by the specific rational fractional multiple implemented by the apparatus, in a manner to be explained.

In operation, the input pulse sequence is applied to the apparatus of the present invention as previously described. For the purpose of explanation, the frequency of the input pulse sequence will be designated as "C" Because the division constant associated with the counter 10 is $K_n$, as previously explained, the frequency of the overflow pulse sequence provided by the counter 10 will be $C/K_n$. Because of the inhibiting action of the gate 14, as previously described, the input pulse sequence to the counter 11 will exhibit a frequency of $C-C/K_n$ Similarly, the frequency of the overflow pulse sequence provided by the counter 11 is then $C/K_{n11}-C/K_{n11}K_n$. Continuing in his manner, it is appreciated that the frequency of the output pulse sequence provided by the counter 13 may be expressed as $F=(C/K_1)(1-1/K_2(1-1/k_3(\ldots(1-1/K_n))\ldots)$. It will then further be appreciated that the rational fractional multiple implemented by the apparatus illustrated in FIG. 1 may be expressed as $F/C$ where $F$ and $C$ are positive integers with $F$ being less than $C$, and $$F/C=\frac{1}{K_1}-\frac{1}{K_1K_2}+\frac{1}{K_1K_2K_3}-\cdots-\frac{1}{K_1K_2K_3\cdots K_n}$$

The counters 10 through 13, with the respectively associated division constants $K_n$ through $K_1$, function to distribute the pulses of the output pulse sequence as uniformly as possible with respect to the pulses of the input pulse sequence.

A procedure for deriving the numerical values of the division constants, $K_1$ through $K_n$, associated with a specific multiple, $F/C$, will now be described. The positive integer $F$ can be divided into the positive integer $C$ an integral number $K_1$ times with a remainder $R_1$, where $R_1$ is a positive integer which is less than $F$. The remainder $R_1$ can then be divided into $C$ an integral number $K_2$ times with a remainder of $R_2$, where $R_2$ is a positive integer which is less than $R_1$. Similarly, an integral constant $K_3$ and a remainder $R_3$ can be derived, where $R_3$ is a positive integer which is less than $R_2$. Continuing this procedure provides the following sequence of equations:

| | |
|---|---|
| $C=K_1F+R_1$ | $0<R_1<F$ |
| $C=K_2R_1+R_2$ | $0<R_2<R_1$ |
| $C=K_3R_2+R_3$ | $0<R_3<R_2$ |
| $C=K_{n11}R_{n12}+R_{n11}$ | $0<R_{n11}<R_{n12}$ |
| $C=K_nR_{n11}$ | |

Where the symbol "<" designates the "less than" relationship between the two numbers with which it is associated.

It is appreciated that since the remainders $R_1$ through $R_{n11}$ comprise a decreasing sequence of positive integers, the sequence must terminate with $C$ being exactly divisible by the remainder $R_{n11}$. The number of equations obtained by this procedure provides the number of counters that may implement the multiple $F/C$ and the integral constants $K_1$ through $K_n$ obtained thereby provide the division constants $K_1$ through $K_n$ associated with the rational multiple $F/C$.

Figure 2:
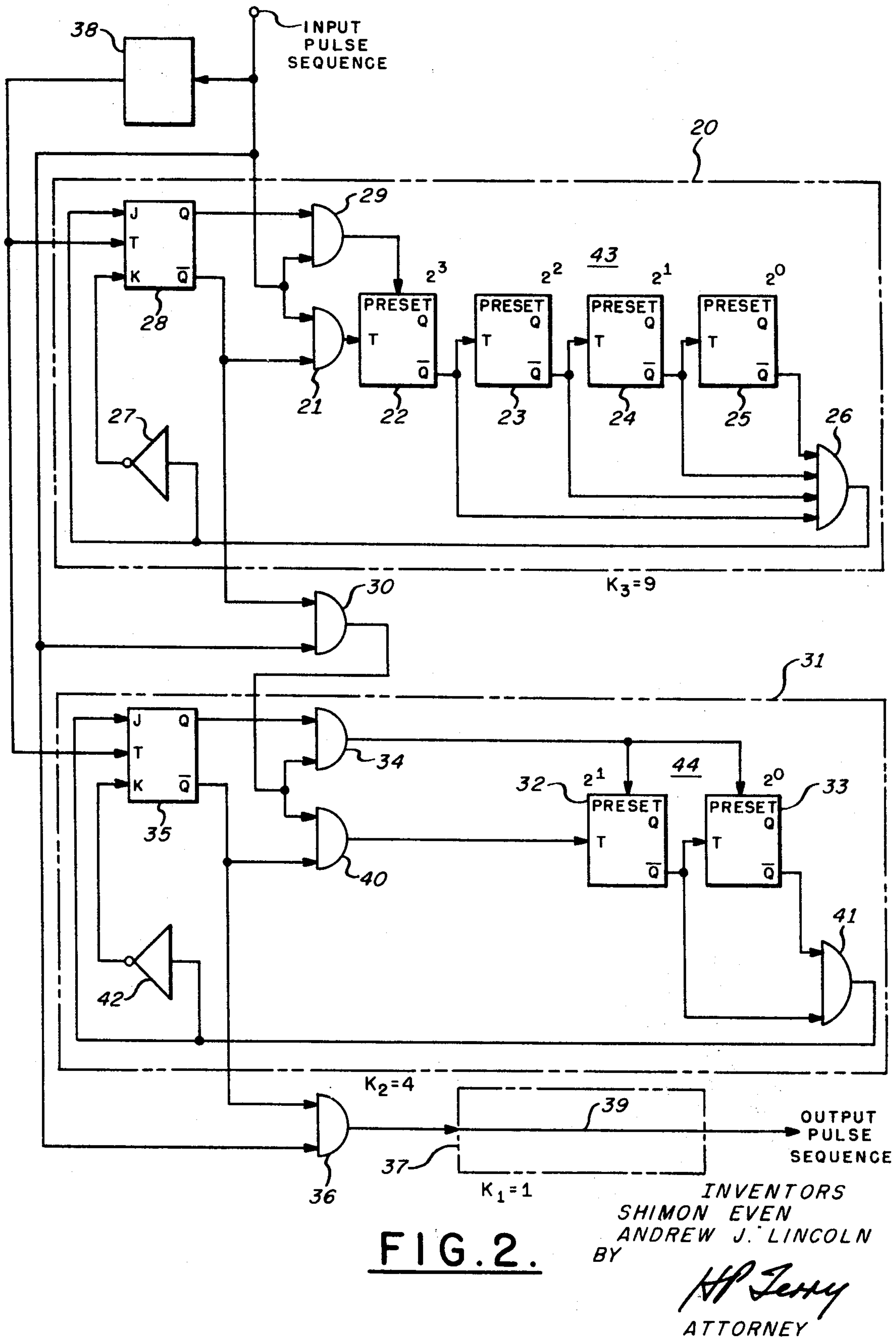
FIG. 2 is a schematic diagram in block form illustrating a specific embodiment of the invention.

Referring now to FIG. 2, a specific embodiment of the invention is illustrated wherein the rational fractional multiple $F/C$ is, for example, 7/9.

The division constants, $K_1$ through $K_n$ associated with the multiple 7/9, will now be derived in the manner previously described. The integer 9 is divisible by the integer 7 one time with a remainder of 2. Therefore, $K_1$=1. The remainder 2 is divisible into 9 four times with a remainder of 1. Therefore, $K_2$=4. The remainder 1 is exactly divisible into 9 nine times, hence $K_3$=9. Since the remainder is now equal to zero, the procedure is completed. The procedure indicates, as previously explained, that three counters may be required to implement the multiple 7/9.

Figure 3:
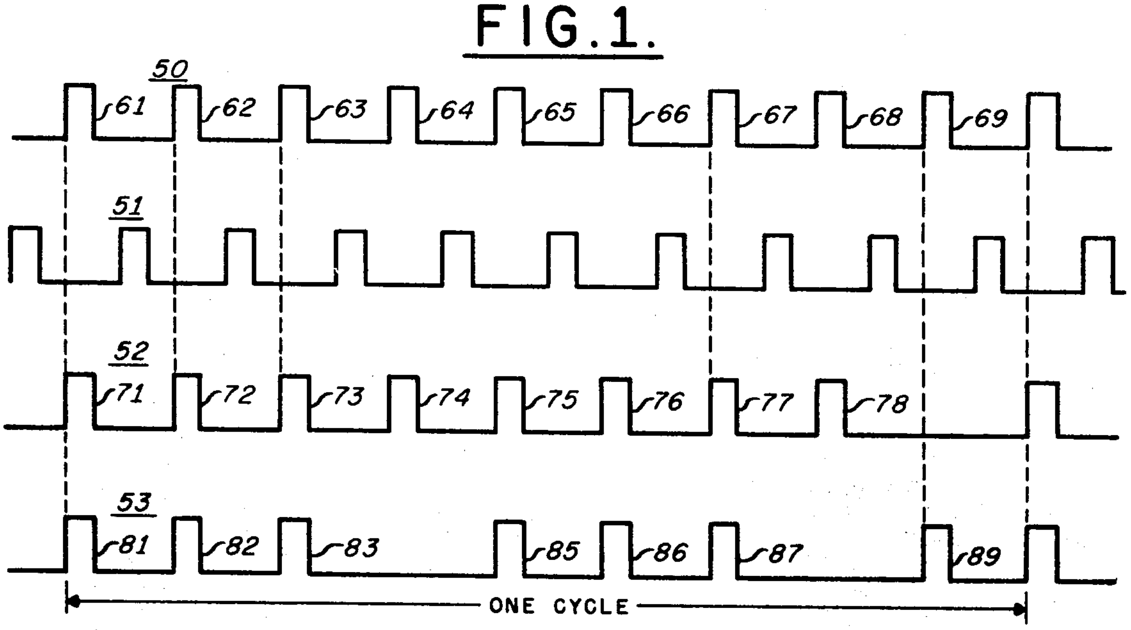
FIG. 3 is a waveform timing diagram illustrating the waveforms present on various conductors of the circuit illustrated in FIG. 2.

The input pulse sequence, illustrated by the waveform 50 of FIG. 3 is applied generally as an input to a binary pulse counter 20. The counter 20 divides the pulse repetition frequency of the input pulse sequence by the division constant $K_3$=9. The input pulse sequence is applied via an AND gate 21 to a conventional binary down counter 43 comprising the flip-flops 22 through 25. The $\bar{Q}$ outputs of the flip-flops 22 through 25 are applied as inputs to an AND gate 26. The AND gate 26 is enabled when the flip-flops 22 through 25 are all in the $\bar{Q}$ state which condition is representative of a count of zero. The output of the AND gate 26 is applied directly and through an inverter 27 to the $J$ and $K$ inputs, respectively, of a flip-flop 28. The flip-flop 28 is also responsive to a timing signal derived from the delayed input pulse sequence which is applied thereto via a delay 38. The delayed input pulse sequence is illustrated by waveform 51 of FIG. 3. The value of the time delay associated with the delay 38 is chosen so that the pulses of the waveform 51 occur intermediate the pulses of the input pulse sequence 50.

The Q output of the flip-flop 28 is applied as an enabling input to an AND gate 29. The AND gate 29, which is also responsive to the input pulse sequence, provides a presetting function for the down counter 43. The signal from the AND gate 29 presets the down counter 43 to the number 8, for reasons to be explained.

The $\bar{Q}$ output of the flip-flop 28 is applied as an enabling input to the AND gate 21 as well as an inhibiting input to an inhibiting AND gate 30. The counter 20 provides an inhibiting signal to the inhibiting AND gate 30 in response to every nine input pulses accumulated through the AND gate 21 by the down counter 43.

The inhibiting AND gate 30 is also responsive to the input pulse sequence and provides generally to a binary pulse counter 31, a gated input pulse sequence which is illustrated by the waveform 52 of FIG. 3. The counter 31 divides the pulse repetition frequency of the gated input pulse sequence, provided by the gate 30, by the division constant $K_2$=4.

The gated input pulse sequence, provided by the inhibiting AND gate 30 is applied via an AND gate 40 to a conventional binary down counter 44 comprising the flip-flops 32 and 33. The $\bar{Q}$ outputs of the flip-flops 32 and 33 are applied as inputs to an AND gate 41. The AND gate 41 is enabled when the flip-flops 32 and 33 are both in the $\bar{Q}$ state which condition is representative of a count of zero. The output of the AND gate 41 is applied directly and through an inverter 42 to the $J$ and $K$ inputs respectively of a flip-flop 35. The flip-flop 35 is also responsive to the timing signal as described with respect to the flip-flop 28.

The $\bar{Q}$ output of the flip-flop 35 is applied as an enabling input to an AND gate 34. The AND gate 34, which is also responsive to the gated input pulse sequence from the inhibiting AND gate 30, provides a presetting function for the down counter 44. The signal from the AND gate 34 presets the down counter 44 to the number 3, for reasons to be explained.

The Q output of the flip-flop 35 is applied as an enabling input to the AND gate 40 as well as an inhibiting input to the inhibiting AND gate 36. The counter 31 provides an inhibiting signal to the AND gate 36 in response to every four gated input pulses from the gate 30 accumulated through the AND gate 40 by the down counter 44.

The inhibiting AND gate 36 is also responsive to the input pulse sequence and provides the output pulse sequence, illustrated by the waveform 53 of FIG. 3, via a counter 37. The counter 37 divides the pulse repetition frequency of the gated input pulse sequence, provided by the gate 36, by the division constant $K_1$=1. The counter 37 hence provides an output pulse for every gated input pulse transmitted through the AND gate 36. Therefore, the counter 37 may comprise the single conductor 39 as illustrated.

In operation, the flip-flop 28 is initially in the $\bar{Q}$ state, the flip-flop 22 is initially in the Q state and the flip-flops 23 through 25 are initially in the $\bar{Q}$ state. Therefore, the down counter 43 is preset to the number 8. Similarly, with respect to the counter 31, the flip-flop 35 is initially in the Q state and the flip-flops 32 and 33 are both initially in the Q state. Therefore, the down counter 44 is preset to the number 3. The input pulse sequence is applied via the AND gate 21 to the down counter 43, as well to the inhibiting AND gates 30 and 36.

Consider, for example, a group of nine sequentially occurring input pulses as illustrated by pulses 61 through 69 of FIG. 3. In response to the eight pulses 61 through 68, which are accumulated by the counter 43 through the AND gate 21, the counter 43 will count from the preset number 8 down to the number 0. The flip-flops 22 through 25 will then each be in the $\bar{Q}$ state. Consequently, the AND gate 26 is enabled, providing a signal that sets the flip-flop 28 to the Q state in response to the next-occurring delayed input pulse provided via the delay 38. The next-occurring input pulse 69, which is the ninth pulse of the considered group of pulses is conducted through the enabled AND gate 29 to reset the down counter to the number 8 once again. The next-occurring delayed input pulse from the delay 38 then resets the flip-flop 28 to the $\bar{Q}$ state.

The inhibiting AND gate 30 is hence enabled during the occurrence of the input pulses 61 through 68 and disabled during the occurrence of the input pulse 69. Therefore, the pulses 61 through 68 are transmitted through the inhibiting AND gate 30 to the counter 31 whereas the input pulse 69 is inhibited from transmission therethrough. The gated input pulse sequence transmitted through the inhibiting AND gate 30 to the counter 31 is illustrated by the waveform 52 of FIG. 3.

The operation of the counter 31 is similar to that of the counter 20 except that the down counter 44 is initially preset to the number 3 as previously explained. The gated input pulse sequence 52 provided by the gate 30 is applied via the enabled AND gate 40 to the down counter 44. In response to the three pulses 71 through 73, the counter 44 will count from the preset number 3 down to the number 0. The flip-flops 32 and 33 will then both be in the $\bar{Q}$ state. Consequently, the AND gate 41 is enabled, providing a signal that sets the flip-flop 35 to the Q state in response to the next-occurring delayed input pulse provided by the delay 38. The next-occurring gated input pulse 74 is conducted through the enabled AND gate 34 to reset the down counter 44 to the number 3 once again. The next-occurring delayed input pulse from the delay 38 then resets the flip-flop 35 to the $\bar{Q}$ state.

The inhibiting AND gate 36 is hence enabled during the occurrence of the gated input pulses 71 through 73 and inhibited during the occurrence of the gated input pulse 74. Therefore, the pulses 71 and 73 are transmitted through the inhibiting AND gate 36 to the counter 37 whereas the pulse 74 is inhibited from transmission therethrough. The pulses conducted through the inhibiting AND gate 36 to the counter 37 are illustrated by the pulses 81 through 83 of the waveform 53 of FIG. 3.

The above-described sequence of operations with respect to the counter 31 is repeated in response to the pulses 75 through 78 hence providing the pulses 85 through 87, via the inhibiting AND gate 36, to the counter 37.

Since the inhibiting AND gate 36 is enabled during the occurrence of the input pulse 69, the pulse 69 is transmitted therethrough to the counter 37. The transmitted pulse 69 is illustrated by pulse 89 of the waveform 53 of FIG. 3.

As previously explained, the counter 37 consists of the conductor 39. Therefore, the seven pulses 81, 82, 83, 85, 86, 87 and 89, which appear on the conductor 39 in response to the nine input pulses 61 through 69, represent one cycle of the output pulse sequence. The pulse repetition frequency of the output pulse sequence is therefore 7/9 that of the input pulse sequence.

The delayed input pulse sequence, illustrated by the waveform 51 of FIG. 3, is provided for timing purposes to the flip-flops 28 and 35 via the delay 38. It will be appreciated that this timing pulse sequence may be separately generated, in a conventional manner, by a timing signal source not shown.

It will be further appreciated that the division constants, $K_1$ through $K_n$, associated with a specific multiple and derived by the procedure previously described, may not be unique. Other sets of constants may be utilized to implement the same multiple.

While the invention has been described in its preferred embodiment, it is to be understood that the words which have been used are words of description rather than limitation and that changes may be made without departing from the true scope and spirit of the invention in its broader aspects.

We claim:

1. Apparatus for dividing the pulse repetition frequency of an input pulse sequence in accordance with a rational fraction comprising a plurality of pulse repetition frequency-dividing means each having an input and an output and each providing a pulse at its output in response to receiving a number of pulses at its input equal to its division constant, and gating means associated with said output of each of said plurality of frequency-dividing means except the last one of said plurality, each said gating means having first and second inputs and an output, said pulse repetition frequency-dividing means and said gating means being concatenated in alternating fashion with said output of each said frequency dividing means, except said last one, coupled to said first input of the next following gating means and said output of each said gating means coupled to said input of said next following frequency-dividing means so that said input pulse sequence is applied directly to a first one of said pulse repetition frequency-dividing means and through respective associated gates to each of said other pulse repetition frequency-dividing means, the division constant of said first frequency-dividing means being greater than two, each of said gating means including means for coupling said input pulse sequence in common to said gating means at said second input thereof for continuous passage of said input pulses therethrough except during those times when said output pulse of a preceding frequency-dividing means is received whereby said gates are inhibited from operation during the presence of said preceding frequency-dividing means output, the pulses from the last dividing means in said concatenated arrangement providing said input pulse sequence with pulse repetition frequency-divided in accordance with said rational fraction.

2. The apparatus of claim 1 in which each said gating means includes means for inhibiting the conduction of one input pulse therethrough in response to each said pulse repetition frequency-dividing means output pulse.

3. The apparatus of claim 1 in which each said pulse repetition frequency-dividing means comprises a binary pulse counter whose overflow signal provides its output pulse.